Sept. 22, 1959     R. W. COURTNEY ET AL     2,905,001
ENGINE SELF-STARTER
Filed Sept. 10, 1956
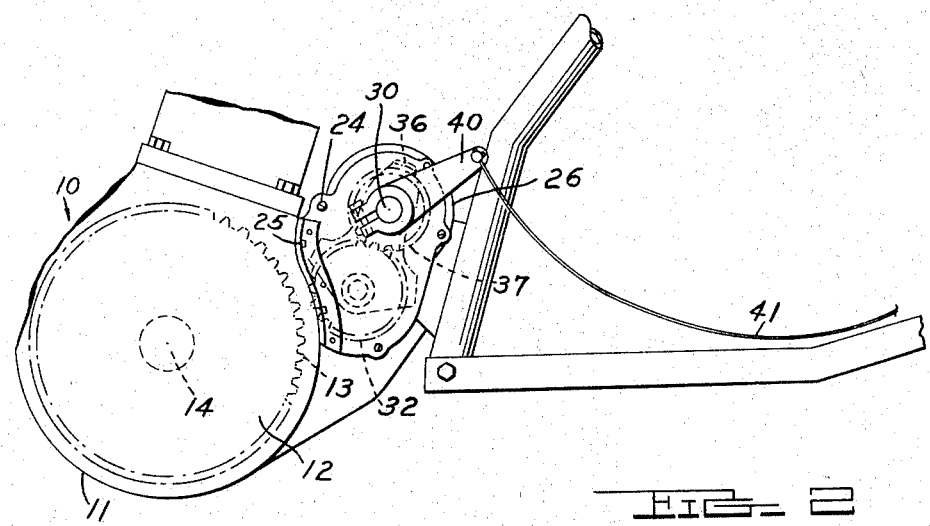
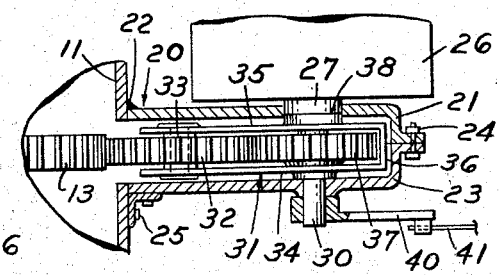
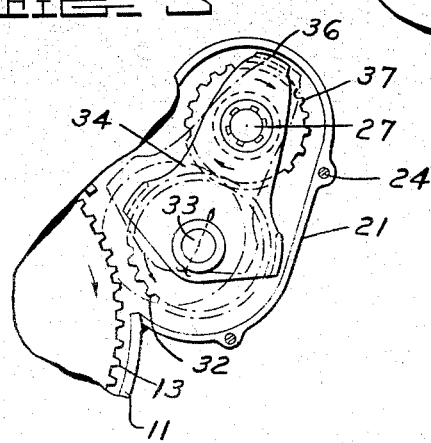
INVENTORS
RAY W. COURTNEY
ORLEY RAY COURTNEY
BY
ATTORNEY United States Patent Office 2,905,001
Patented Sept. 22, 1959

2,905,001

ENGINE SELF-STARTER

Ray W. Courtney, Drayton Plains, and
Orley Ray Courtney, Pontiac, Mich.

Application September 10, 1956, Serial No. 608,920

4 Claims. (Cl. 74—8)

This invention relates to self-starters and particularly pertains to a shallow-depth, compact, engine self-starter gearing arrangement particularly suitable for motor-cycles.

Self-starters for vehicle engines have been employed heretofore to facilitate starting the vehicle engine without the use of manual power, however, the several devices of the prior art have not proven entirely satisfactory especially for motor-cycles inasmuch as they are usually too large to be incorporated therewith and are complicated in design and construction, expensive to manufacture, and difficult and non-positive in use.

With the foregoing in view, the primary object of the invention is to provide a short, shallow-depth, compact, engine self-starter particularly suitable for motor-cycles which is simple in design and construction, inexpensive to manufacture, easy to use, and which is positive in engaging and in disengaging action.

An object of the invention is to provide a gearing arrangement which is capable of engaging and disengaging the toothed fly-wheel of the motor-cycle engine.

An object of the invention is to provide a case mountable on the engine block and communicating internally with the engine flywheel which is composed of a fixed side portion and a removable side portion.

An object of the invention is to provide a motor and splined shaft fixedly mounted on the fixed side portion.

An object of the invention is to provide a pivotally mounted stub shaft on the starter case removable side portion with a gear carrier and cage connected thereto for pivotal movement therewith.

An object of the invention is to provide a gear rotatably and swingably mounted on the carrier and a gear caged within the carrier adapted to receive the spline of the starter motor shaft in driving relationship and to externally engage the swingably mounted gear on the carrier.

An object of the invention is to provide a journaled relationship between the starter motor shaft gear and the gear carrier for positively holding the intermediate swinging gear in engagement therewith.

An object of the invention is to provide an angulation between the gears, carrier and flywheel in conjunction with the rotation of the gear and flywheel such that the flywheel engaging gear works into meshing engagement with the flywheel during the starting portion of the movement.

An object of the invention is to provide an angulation and meshing engagement between the flywheel and the flywheel driving gear such that when the flywheel overrides the driving gear when the vehicle engine starts that the flywheel automatically disengages the driving gear therefrom.

An object of the invention is to provide a self-starter arrangement particularly suitable for motor-cycles which can be manufactured inexpensively as the component parts are easily made and the assembly of the parts readily accomplished.

An object of the invention is to provide a vehicle motor or engine self-starter which can be fitted to any and all sizes of motors or engines without changes in its assembly or arrangement of parts.

These and other objects of the invention will become apparent by reference to the following description of an engine self-starter embodying the invention taken in connection with the accompanying drawing in which:

Fig. 1 is a side elevational view of an engine with the inventive self-starter mounted thereon.

Fig. 2 is a top view of the device seen in Fig. 1, partly in cross section, showing the internal structure of the device; and Fig. 3 is a partial view of the self-starter portion of Fig. 1 with parts removed showing the internal integration.

Referring now to the drawing wherein like numerals refer to like and corresponding parts throughout the several views, the engine self-starter disclosed therein to illustrate the invention comprises an engine 10 having a flywheel case 11 shrouding the flywheel 12 which is equipped on its external periphery with teeth 13 and which is connected to the engine crank shaft 14 at its center. The starter gearing case 20 is equipped with a fixed side portion 21 fixedly mounted on the engine case 11 as by welding and a removable side portion 23 which bolted to the fixed case 21 as at 24 and to the motor case 11 as at 25. The starting motor 26 is fixedly mounted to the fixed side portion 21 and the motor revolving armature terminates in an externally splined shaft 27 which extends outwardly into the internal area to be defined by the case sides 21 and 23.

The stub shaft 30 is pivotally mounted on the removable side portion 23 and axially alined with the motor stub shaft 27 and carries the gear carrier and cage 31 for pivotal and swinging movement therewith while, in turn, the carrier 31 rotatably supports the intermediate gear 32 via the axle 33, and it is to be particularly noted, that the carrier 31 is composed of a side 34 welded or otherwise connected to the stub shaft 30 and a side 35 connected to the side 34 by the end bridge portion 36. The starting motor 26 drive gear 37 is caged within the carrier 31 via journal portions or hubs 38 on the gear 37 and is in engagement with the gear 32.

The pivotal axis of the stub shaft 30 and carrier 31 are so integrated relative to the flywheel 12 and teeth 13 in conjunction with the direction of rotation of the flywheel and intermediate gear 32, that the flywheel intermediate gear 32 climbs into driving relationship with the flywheel 12 under the power of the starter motor 26; while under the power of the engine 10, the flywheel 12 will over-run the driving gear 32 so that the gear 32 will climb out of engagement with the flywheel 12 thereby freeing drive therebetween and preventing damage to the gearing and other structure.

It is to be particularly noted that the bearing elements of the carrier 31 in conjunction with the hubs 38 on the gear 37 hold the gear 37 in proper aligned relationship with the stub shaft 30 and in engagement with the gear 32 when the removable side portion 23 of the gearing case is removed, and, conversely when the removable side portion 23 is mounted with the gear 37 fitted on the splined shaft 27, that the hubs 38 and bearing portions of the carrier reverse in operation so that the gear 37 then assists in supporting the carrier 31 so that undue strain is not placed on the stub shaft 30 and so that the gears are maintained in proper driving relationship and meshing relationship with one another.

The lever 40 is fixed on the stub shaft 30 and connected to an operating linkage such as a bowden cable 41 so that the operator can easily pivotally move the stub shaft 30 to swing the carrier to engage the intermediate gear 32 with the flywheel when it is desired to start the engine 10; and it is obvious that the flywheel 12 will have sufficient power upon the engine 10 starting to throw the driving gear out of engagement therewith and to reverse cable 41 or other linkage to disengage the starter mechanism from the engine.

Although but a single embodiment of the invention has been shown and described in detail, it is obvious that many changes may be made in the size, shape, detail in arrangement, of the various elements of the invention within the scope of the appended claims.

We claim:

1. A shallow depth, compact engine self-starter gearing arrangement particularly suitable for motor-cycles comprising a flywheel having a toothed periphery, an engine housing encasing said flywheel, a gear and motor support housing mounted on said engine housing and internally communicating therewith; said supporting housing comprising a fixed side portion and a removable side portion; a starter motor mounted on said fixed side portion, a splined shaft leading from said motor to the interior of said support housing through said fixed side portion, a pivotally mounted stub shaft mounted on said removable side portion axially disposed on the axis as said splined shaft, a gear carrier and cage connected to said stub shaft for pivotal movement therewith, a first gear pivotally mounted on said carrier adapted to swing in an arc into and out of engagement with said flywheel teeth in conjunction with pivotal movement of said stub shaft and carrier, and a second gear caged in said carrier meshing with said first gear; said second gear being internally splined for receiving said splined shaft in supporting and driving relationship; said carrier being further journaled on said second gear for additional support of said first gear in meshing with said second gear; and a lever on said stub shaft adapted to pivot said carrier to move said first gear into engagement with said flywheel teeth to start the engine; said first gear being so rotationally moved in conjunction with the angle of said carrier to said flywheel as to work into flywheel engagement in starting an engine and consequently to be moved out of engagement with said flywheel by the flywheel over-running said first gear upon the engine starting; said removable side portion, stub shaft, carrier, and said first and second gears being mountable and demountable as a unit.

2. A shallow depth, compact engine self-starter gearing arrangement particularly suitable for motor-cycles with a toothed flywheel and engine housing encasing the flywheel comprising a gear and motor support housing mountable on an engine housing for internally communicating therewith; said supporting housing comprising a fixed side portion and a removable side portion; a starter motor mounted on said fixed side portion, a splined shaft leading from said motor to the interior of said support housing through said fixed side portion, a pivotally mounted stub shaft mounted on said removable side portion axially disposed on the axis as said splined shaft, a gear carrier and cage connected to said stub shaft for pivotal movement therewith, a first gear pivotally mounted on said carrier adapted to swing in an arc into and out of engagement with flywheel teeth in conjunction with pivotal movement of said stub shaft and carrier, and a second gear caged in said carrier meshing with said first gear; said second gear being internally splined for receiving said splined shaft in supporting and driving relationship; said carrier being further journaled on said second gear for additional support of said first gear in meshing with said second gear, and a lever on said stub shaft adapted to pivot said carrier to move said first gear into engagement with flywheel teeth to start the engine; said first gear being so rotationally moved in conjunction with the angle of said carrier to a flywheel as to work into flywheel engagement in starting, and consequently to be moved out of engagement with a flywheel by the flywheel over-running said first gear upon the engine starting.

3. A shallow depth, compact engine self-starter gearing arrangement particularly suitable for motor-cycles with a toothed flywheel and engine housing encasing the flywheel comprising a gear and motor support housing mountable on an engine housing for internally communicating therewith; said supporting housing comprising a fixed side portion and a removable side portion; a starter motor mounted on said fixed side portion, a splined shaft leading from said motor to the interior of said support housing through said fixed side portion, a pivotally mounted stub shaft mounted on said removable side portion pivotally disposed on the axis as said splined shaft, a gear carrier and cage connected to said stub shaft for pivotal movement therewith, a first gear pivotally mounted on said carrier adapted to swing in an arc into and out of engagement with flywheel teeth in conjunction with pivotal movement of said stub shaft and carrier, and a second gear caged in said carrier meshing with said first gear; said second gear being internally splined for receiving said splined shaft in supporting and driving relationship; said carrier being further journaled on said second gear for additional support of said first gear in meshing with said second gear, and means adapted to pivot said carrier to move said first gear into engagement with flywheel teeth to start the engine.

4. A self-starter gearing arrangement particularly suitable for motor-cycles comprising a gear and motor support housing adapted to be mounted on an engine housing, said support housing comprising a first side portion and a second side portion; a starter motor mounted on said first side portion of said support housing, a splined shaft leading from said motor to the interior of said support housing through said first side portion, a pivotally mounted gear carrier and cage pivotally mounted on said second portion, a first gear pivotally mounted on said carrier adapted to swing in an arc into and out of engagement with a flywheel in conjunction with pivotal movement of said carrier, and a second gear caged in said carrier meshing with said first gear; said second gear being internally splined for receiving said splined shaft in support and driving relationship; said carrier being further journaled on said second gear for additional support of said first gear in meshing with said second gear, and means adapted to pivot said carrier to move said first gear into engagement with said flywheel to start the engine.

References Cited in the file of this patent

UNITED STATES PATENTS

| 242,307 | Hammond | May 31, 1881 |
|---|---|---|
| 807,274 | Johnson | Dec. 12, 1905 |
| 1,262,666 | Heinze | Apr. 16, 1918 |
| 1,448,926 | Jencick | Mar. 20, 1923 |
| 1,683,165 | Coulombe | Sept. 4, 1928 |
| 2,025,877 | Maurer | Dec. 31, 1935 |
| 2,502,336 | Miller | Mar. 28, 1950 |

FOREIGN PATENTS

| 698,171 | France | Nov. 17, 1930 |
|---|---|---|
| 713,102 | France | Aug. 10, 1931 |